US006951074B2

United States Patent
Miller

(12) United States Patent
(10) Patent No.: US 6,951,074 B2
(45) Date of Patent: Oct. 4, 2005

(54) CULTIVATION OF MORCHELLA

(76) Inventor: Stewart C. Miller, 1521 S. 9th St., Lafayette, IN (US) 47905

( * ) Notice: Subject to any disclaimer, the term of this patent is extended or adjusted under 35 U.S.C. 154(b) by 231 days.

(21) Appl. No.: 10/603,525

(22) Filed: Jun. 25, 2003

(65) Prior Publication Data

US 2004/0060230 A1 Apr. 1, 2004

Related U.S. Application Data

(63) Continuation-in-part of application No. 10/180,690, filed on Jun. 26, 2002.

(51) Int. Cl.$^7$ ................................................. A01G 1/04
(52) U.S. Cl. ........................................................ 47/1.1
(58) Field of Search ............................... 47/1.1, 58.1 R

(56) References Cited

U.S. PATENT DOCUMENTS

| | | |
|---|---|---|
| 3,945,969 A | 3/1976 | Horn et al. |
| 4,164,405 A | 8/1979 | Pinckard |
| 4,594,809 A | 6/1986 | Ower et al. |
| 4,599,312 A | 7/1986 | Mugnier et al. |
| 4,757,640 A | 7/1988 | Ower, deceased et al. |
| 4,810,504 A | 3/1989 | Schindler |
| 4,866,878 A | 9/1989 | Ower et al. |
| 5,022,603 A | 6/1991 | Maree et al. |
| 5,123,203 A | 6/1992 | Hiromoto |
| 5,178,642 A | 1/1993 | Janerette |
| 5,427,592 A | 6/1995 | Romaine et al. |
| 5,759,223 A | 6/1998 | Carlson et al. |
| 5,934,012 A | 8/1999 | Holtz et al. |

FOREIGN PATENT DOCUMENTS

| | | | |
|---|---|---|---|
| EP | 209627 A2 * | 1/1987 | ............ A01G/7/00 |
| EP | 221157 | 5/1987 | |
| EP | 373348 | 6/1990 | |
| JP | 10113070 | 5/1998 | |
| JP | 10215678 | 8/1998 | |
| JP | 2000092983 | 4/2000 | |
| JP | 2001078566 | 3/2001 | |

OTHER PUBLICATIONS

"Phosphate Activity of External Hyphae of Two Arbuscular Mycorrhizal Fungi", Joner et al.; Mycological Research 104, No. 1 (2000); pp 81–86.
"Endophytic Fungi Associated with Palms", Frohlich et al.; Mycological Research 104, No. 10 (2000); pp. 1202–1212.
"The Mushroom Handbook", Louis C.C. Krieger, Dober Publications, Jun. 1967; pp. 20–21, 32–39, 56–57, Plates 26 & 27.
"Answorth & Bisby's Dictionary of the Fungi" Hawksworth et al.; CAB International Publishing.

(Continued)

Primary Examiner—Teri Pham Luu
Assistant Examiner—Francis T. Palo
(74) Attorney, Agent, or Firm—Baker & Daniels

(57) ABSTRACT

A process for cultivating *Morchella ascocarps* using mycelium and a tree seedling, the tree seedling having a root system and a shoot system. The process includes the steps of inoculating the root system with the mycelium to produce an inoculated tree seedling; stimulating the mycelium to form sclerotia by distressing the inoculated tree seedling; and inducing the sclerotia to produce ascocarps by providing conditions conducive to the formation of ascocarps. Also, the growth of trees may be accelerated by inoculating the root system with the mycelium. Further more, a process for cultivating *Morchella sclerotia* using mycelium and a tree seedling, the tree seedling having a root system and a shoot system includes the steps of inoculating the root system with the mycelium to produce an inoculated tree seedling; and stimulating the mycelium to form sclerotia by distressing the inoculated tree seedling.

15 Claims, 5 Drawing Sheets

(2 of 5 Drawing Sheet(s) Filed in Color)

OTHER PUBLICATIONS

"Mushrooms of Northeastern North America", Bessette et al.; Print Net (1997); pp. 476–477.

"Allelic Variation and Segregation in *Morchella deliciosa* and *M. Esculenta*", Gessner et al.; Mycologia, vol. 79, No. 5 (1987); pp. 683–687.

"A rapid Staining Method for Detection of Endophytic Fungi in Turf and Forage Grasses", Saha et al.; The American Phytopathological Society, vol. 78, No. 2, (1988); pp. 237–239.

"Distribution and Molecular Characterization of the Root Endophyte Phialocephala Fortinii Along an Environmental Gradient in the Boreal Forest of Alberts", Addy et al.; Mycological Research 104, No. 10 (2000); pp. 1213–1221.

Website information from www.truffletree.com for New World Truffieres, Inc. "Truffle Cultivation Specialists", Copyright 2003.

* cited by examiner

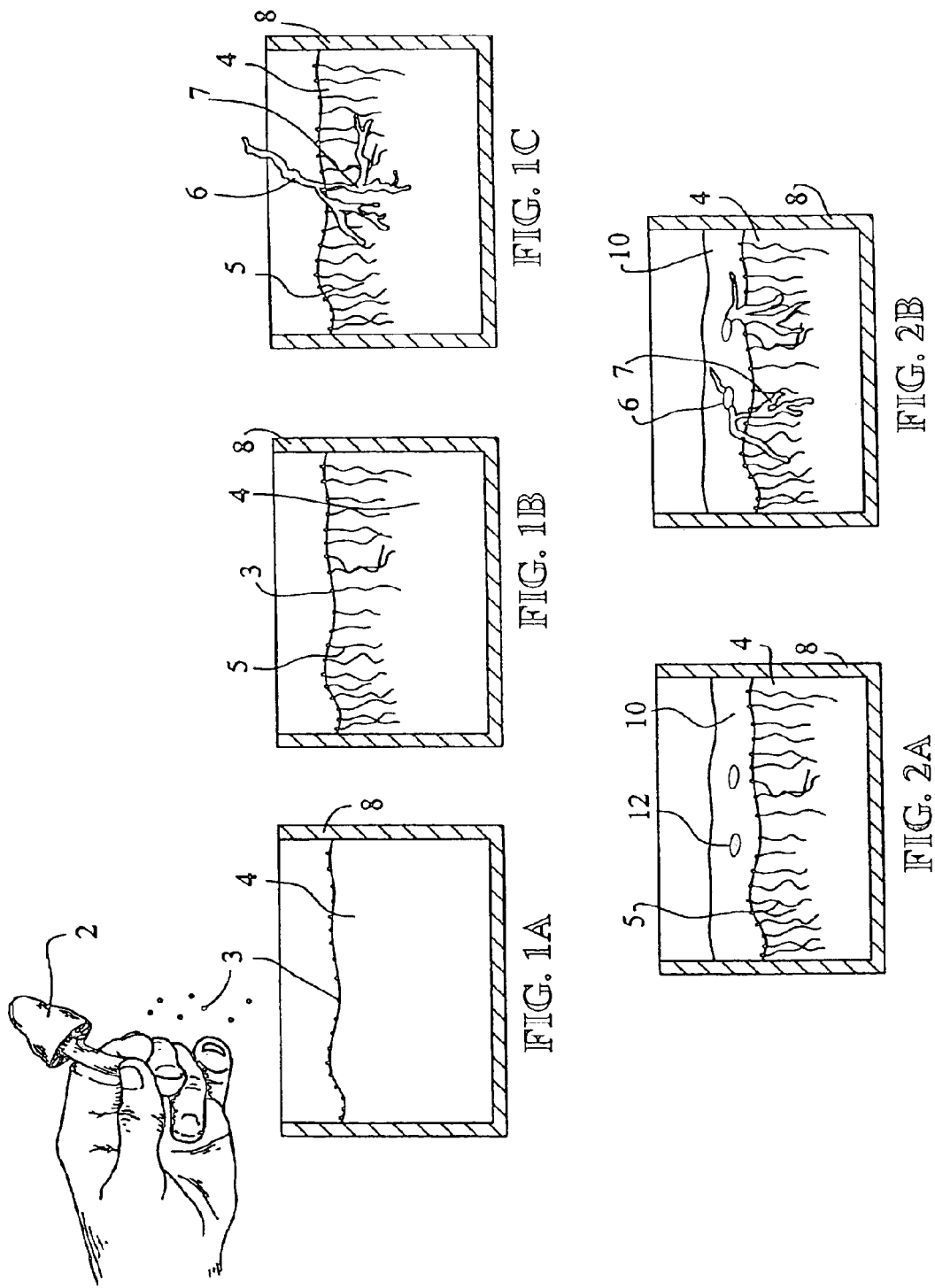

CULTIVATION OF MORCHELLA

This application is a Continuation-in-Part of U.S. application Ser. No. 10/180,690 filed Jun. 26, 2002, entitled CULTIVATION OF MORCHELLA.

FIELD OF THE INVENTION

This invention relates to the cultivation of any of the fungi species of the Family *Morchellaceae* and the genera *Morchella*.

BACKGROUND OF THE INVENTION

The edible fungi species of the genera *Morchella* are known by their ascocarp or fruiting body. The ascocarp represents the mature embodiment of the sexual reproduction cycle of the morel and is lined with tiny, microscopic elongated sacs, each of which is called an ascus. Inside each ascus are microscopic spores lined up like small eggs, approximately eight spores per ascus. These spores escape from the lid of the ascus and take to the air marking the beginning of the life cycle of the morel mushroom. When the spores land on an appropriate food source, such as moist, dead, rotting, or decaying plant life, the spores will "hatch" producing small hair-like structures called hyphae. The hyphae begin to spread throughout the food source producing an interwoven mat or feeding network called mycelium. The hyphae's absorption of nutrients from the non-living food source demonstrates the saprophytic nature of the morel. Under certain, unfavorable conditions, this mycelium contracts to form hardened protective bodies called sclerotia. The sclerotia then lie dormant until favorable conditions arise. During favorable conditions, the sclerotia develop ascocarps.

The ascocarps of the Family *Morchellaceae*, especially those of *morchella esculenta, morchella deliciosa, morchella crassipes, elata, semi-libria*, and *morchella angusticeps* "black" have been highly sought after for many years and are considered to be the most delicious of all mushrooms. Every spring thousands of morel hunters take to the woods in search of the ever-elusive morel, also known as the "sponge mushroom." In fact, certain towns in Michigan hold mushroom festivals every spring to celebrate the opportunity to take to the woods and find this delicious morsel. Unfortunately, the fruiting of the morel occurs naturally only under select conditions, thereby limiting the availability of this highly sought after delicacy.

In addition, the sclerotia themselves are also a sought-after delicacy. Unfortunately, because naturally-occurring sclerotia are formed underground, they are difficult to locate and harvest. In fact, the harvesting of *Morchellaceae* sclerotia often requires the use of trained animals, such as dogs. Due to the difficulty in locating and harvesting *Morchellaceae sclerotia*, the cost of such sclerotia is extremely high.

Processes centered around the saprophytic nature of the morel have been suggested for commercially cultivating morels. Such processes include that described in U.S. Pat. No. 4,757,640. However, these processes have not proven to be successful in the commercial production of these mushrooms or the sclerotia, either in the field, or in environmentally controlled conditions.

SUMMARY OF THE INVENTION

The present invention provides a process for cultivating *Morchellaceae* ascocarps using mycelium and a tree seedling, the tree seedling having a root system and a shoot system. The process involves inoculating the root system with mycelium to produce an inoculated tree seedling, stimulating the mycelium to form sclerotia, and inducing the sclerotia to produce ascocarps.

The present invention also provides a process for cultivating *Morchellaceae* sclerotia using mycelium and a tree seedling, the tree seedling having a root system and a shoot system. The process involves inoculating the root system with mycelium to produce an inoculated tree seedling, stimulating the mycelium to form sclerotia.

The present invention further provides a process for accelerating the growth of trees by inoculating the root system of the tree with mycelium.

DESCRIPTION OF THE FIGURES

The file of this patent contains at least one drawing executed in color. Copies of this patent with color drawings will be provided by the Patent and Trademark Office upon request and payment of the necessary fee.

The above-mentioned and other features and objects of this invention, and the manner of attaining them, will become more apparent and the invention itself will be better understood by reference to the following description of embodiments of the invention taken in conjunction with the accompanying drawings, wherein:

FIGS. 1*a*–1*c* illustrate the inoculation step of the present invention according to one embodiment.

FIGS. 2*a*–2*b* illustrate the inoculation step of the present invention according to another embodiment.

Figure 3A:
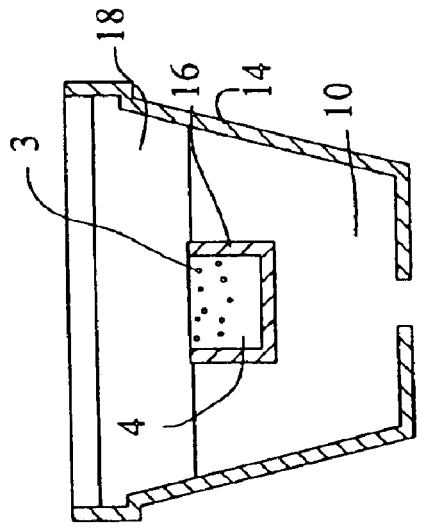
FIGS. 3*a*–3*f* illustrate the inoculation step of the present invention according to yet another embodiment.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DETAILED DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize the teachings.

The present inventor has discovered that saprophytism is only one of the characteristics exhibited during the growth cycle of the morel fungus. During its life cycle, the morel also demonstrates mutualism. For example, in the case of the apple tree, the spores of the morel hatch on a rotting apple. The mycelium, acting as a saprobe, absorbs nutrients from the rotting apple. Next, the hyphae of the mycelium spread from the rotting apple to the root of the apple tree seed. The root of the apple tree then begins poking its way into the ground taking the hyphae with it.

The developing fungus begins it's mutualistic behavior, also referred to as mycorrhizal phase, when the hyphae of the mycelium invade the root of the tree, working its way into the cells of the root system. The mutualistic association between the mycelium and the tree root can be referred to generally as mycorrhiza. Once the mycelium has completely entered the root cells of the tree the mutualistic association is then referred to as endomycorrhiza, or an endophyte. Through the mycelial inoculation of the roots of the tree a symbiotic mycorrhizal or endomycorrhizal relationship develops over time. The fungus and tree coexist together to form a mutualistic relationship, or symbiosis. The tree provides the mycorrhiza fungus with a food source from the fruit or sap. The fungus, in turn, promotes healthy growth of the tree by transferring water and nutrients from the soil, which the tree would otherwise have difficulty obtaining.

The present inventor has further discovered that both the tree and the morel fungus coexist in this mutualistic manner until the relationship is disrupted. Such disruption can be the result of many things including: the tree losing its sap or the death of the tree, such as by the infection of Dutch-Elm disease. Whether the disruption is natural or initiated, the mycorrhizas recognize the loss of their food source and respond defensively by retracting the mycelium into a sclerotic nodule. The mycelium retraction initiates the development of the sclerotia, which ultimately produces the ascocarp or fruiting body when the time and conditions are right.

This discovery has lead to one embodiment of the present invention, which provides a process for cultivating *Morchella ascocarps* using a tree seedling having a root system and a shoot system, and *Morchella mycelium*. The process generally involves inoculating the root system with *Morchella mycelium* to produce an inoculated tree seedling, stimulating the mycelium to form sclerotia, and inducing the sclerotia to produce ascocarps.

The inoculation step generally calls for inoculating the root system of a tree seedling with mycelium. The mycelium used in the inoculation step may be obtained using several different cultivation methods.

In one embodiment, the mycelium is cultivated by introducing one or more spores onto a culture medium and incubating the spores until the spores produce mycelium. This cultivation of mycelium may be accomplished by placing dried ascocarps of whole, unwashed, and freshly picked morel mushrooms in paper bags. The paper bags prevent moisture from being trapped inside the ascocarps, thereby impeding rot or bacteria growth on the ripened and dried spores. The spores may be saved for short periods of time, without any adverse affect on spore germination, by placing the paper bags in a refrigerator.

An acceptable culture medium is then prepared. Acceptable culture media include standard mycological culture media sold by laboratory supply houses. Such mycological culture medium is composed primarily of simple carbohydrates and gelatin, and is easily attainable and extremely reliable by virtue of its nutrient consistency and its sterility. Alternatively, the culture medium can consist simply of natural carbohydrates or decaying plant material.

The culture medium is then introduced into containers, such as Petri dishes, jars, and plastic, foam, or peat cups. To promote efficiency and eliminate waste, biodegradable seed containers may also be used as culture medium containers. These containers typically consist of a paper-based, cardboard-like material that decomposes in the ground after time. These biodegradable containers promote efficiency because the container and the inoculated tree seedling that ultimately is produced in the container (as described infra paragraph 0034) can be planted directly into the ground. To keep out competing fungi and bacteria, it is beneficial to use containers that have lids. Alternatively, the containers can be tightly stacked to prevent invading competition.

As shown in FIG. 1a, the ascocarps 2 are removed from the paper bag and shaken over the top of the culture medium 4 like a saltshaker. The spores 3 land densely over the culture medium 4 and are spread over or stirred into the culture medium 4 using a sterile fork. Alternatively, tiny pieces about the size of a pencil head may be cut from the ascocarps and placed on top of, or inside of, the culture medium.

Figure 4:
FIG. 4 is a photograph illustrating mycelium.

The spore-containing culture medium is then allowed to incubate at a temperature in the range of about approximately $0°$ C.–$37.8°$ C. ($32°$ F.–$100°$ F.), to allow the spores 3 to develop a network of mycelium 5, as shown in FIGS. 1b & 4. Although the mycelium can develop at any temperature within this range, the mycelium development is optimal when the spores are incubated at a temperature within the range of $7.2°$ C.–$23.9°$ C. ($45°$ F.–$75°$ F.). Typically in this temperature range, the growth rate of the mycelium in the medium during incubation is directly proportional to the temperature. That is, the mycelium grows more rapidly when incubated at temperatures in the higher end of this range. Mycelium can develop after as little as 24 hours of incubation. However, to insure a substantial supply of mycelium, the mycelium is incubated for one to two weeks. As shown in FIG. 4 confirmation of mycelium cultivation may be observed by viewing under the microscope at 100×.

The tree seedlings used in the present invention can be either germinated from seeds, or can be purchased from nurseries. Any compatible tree seedling may be used. Such compatible tree seedlings include, but are not limited to, elm, ash, oak, peach, poplar, douglas fir, cherry and apple. While many different types of tree seedlings can be used, the elm tree is inexpensive, expendable, produces a voluminous amount of seed, and is easy to germinate. The elm tree is considered expendable because Dutch-Elm disease has reduced the elm's life expectancy to a minimum. Some old surviving elms still exist, which produce vast amounts of seeds. The expendable and plentiful elm seeds provide a good conduit for the successful production of the morel mushroom, because it is the ultimate death of the tree that stimulates the formation of sclerotia, and ultimately the production of the ascocarp.

Figure 5:
FIG. 5 is a photograph illustrating an inoculated root system.

Several methods can be used to inoculate the tree seedlings. For instance, in one embodiment shown in FIG. 1c, the root system 7 of the tree seedling 6 is introduced into the mycelium 5-containing culture medium 4, and the resulting culture medium 4 containing the mycelium 5 and the root system 7 is incubated until the mycelium 5 has inoculated the root system 7. More specifically, the tree seedlings 6 are placed in the containers 8 of incubating mycelium 5 so that the roots 7 are covered with the cultivating medium 4. The roots of the tree seedlings 6 may be bent or curled at the same time to insure that they are substantially enveloped by the culture medium 4. The seedlings 6 and mycelium 5 are incubated in the culture medium 4 until the root system 7 is adequately inoculated with the mycelium 5. The seedlings may be incubated at a temperature within the range of $0°$ C.–$37.8°$ C. ($32°$ F.–$100°$ F.), although adequate inoculation occurs more predictably when incubated at a temperature within the range of $7.2°$ C.–$23.9°$ C. ($45°$ F.–$75°$ F.). The seedlings are watered sparingly and excess water is drained away to prevent over watering. Adequate inoculation usually occurs within about 1 to 20 days, and can be confirmed microscopically at 100–400× after soaking the root segment with a 1:1 (gram to mL) ratio of rose bengal and distilled water (sodium hydroxide can be used to thin the staining solution) for about 5 to 20 minutes, flattening the root segment between two slides, and viewing the root segment through a green filter; an example of which is shown in FIG. 5. FIG. 5 is a 400× microscopic photograph of the hyphae of a spore entering the root of the tree seedling.

In another embodiment illustrated in FIGS. 2a–2b, a layer of any acceptable planting medium 10 is placed on top of the mycelium 5-containing culture medium 4 and at least one tree seed 12 is placed on top of, or within the layer of planting medium 10. Acceptable planting medium is any medium that fosters the germination of a tree seed and the growth of the tree seedling. Acceptable planting media include, but are not limited to: soil, compost, manure, humus, peat moss, processed paper, pulp, sphagnum, perlite, synthetic material and mixtures thereof. The seed 12 is then incubated for a period of 1 to 30 days to allow the seed 12 to germinate into a tree seedling 6. The tree seedling 6 is grown until the root system 7 of the tree seedling 6 spreads into the mycelium 5-containing culture medium 4 (FIG. 2b) and becomes adequately inoculated with the mycelium 5. Adequate inoculation is illustrated in FIG. 5 and in this embodiment usually occurs within about 1 to 30 days. Adequate inoculation can be tested microscopically as described above.

Figure 3B:
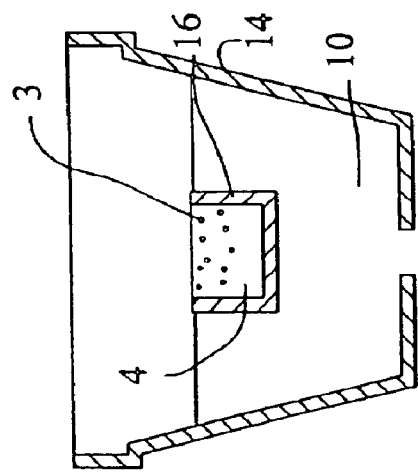
Figure 3C:
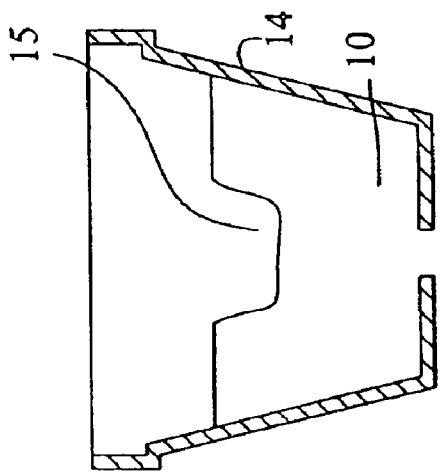
Figure 3D:
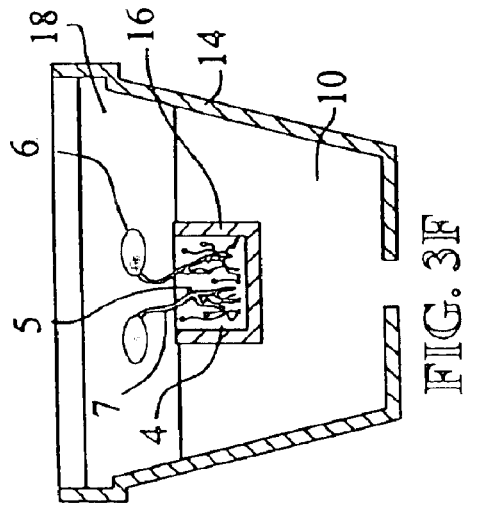
Figure 3E:
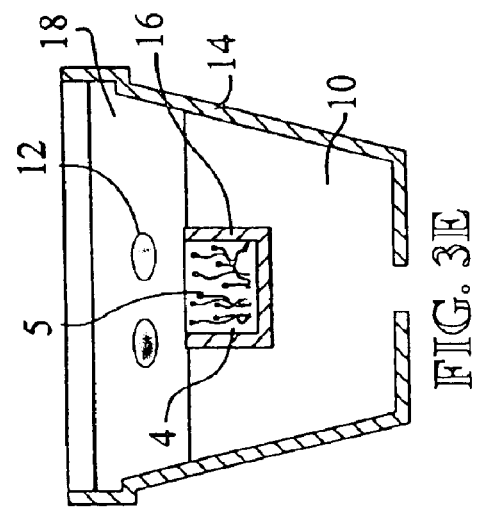

In yet another embodiment shown in FIGS. 3a–3f, a planting medium 10 is placed in a container or pot 14 having good drainage, such as a clay, plastic, or biodegradable pot, and a small hole 15 is scooped out of the planting medium as more particularly shown in FIG. 3a. As illustrated in FIG. 3b, a biodegradable container 16 of spore 3-containing culture medium 4 is placed in the hole of the planting medium 10 so that the culture medium 4 is substantially level with the top of the planting medium 10. The culture medium 4 and planting medium 10 are then covered with a layer, approximately one-half inch deep, of an acceptable germinating medium 18, as shown in FIG. 3c. An acceptable germinating medium 18 is any medium in which a tree seedling can germinate. Such germinating media include, but are not limited to: soil, compost, humus, peat moss, compressed peat moss discs, processed paper, perlite, synthetic material and any mixture thereof. It may be beneficial to use a sterile germinating medium 18 to deter invading bacteria and fungi. The spores 3 are then incubated until the spores 3 produce mycelium 5 (see FIG. 3d); about 1 to 30 days, at a temperature within in the range of about approximately 0° C.–35° C. (32° F.–95° F.), with a preferred temperature within the range of about 7.2° C.–23.9° C. (45° F.–75° F.).

Figure 3F:
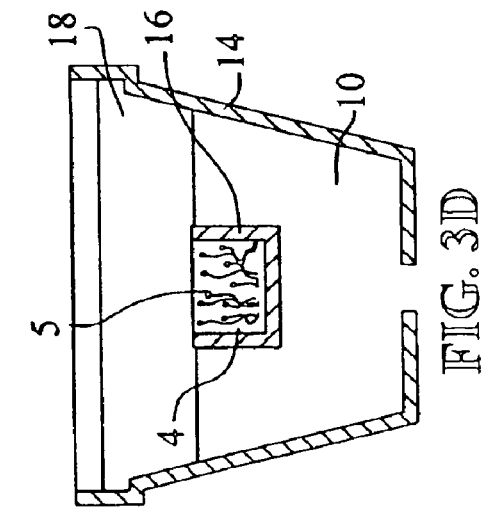

At least one tree seed 12 is then placed on top of or within the germinating medium 18 (see FIG. 3e), and the seed 12 is incubated until the seed 12 germinates into a tree seedling 6 as shown in FIG. 3f. The seed 12 and resulting tree seedling 6 are watered, although relatively sparingly and excess water should be drained away to prevent over watering. As shown in FIG. 3f, the tree seedling 6 is grown until the root system 7 spreads into the mycelium 5-containing culture medium 4 and root system 7 becomes adequately inoculated with the mycelium 5. Adequate infection in this embodiment usually occurs within about 1 to 30 days, and is illustrated in FIG. 5.

Alternatively, the mycelium and the tree seedling may be cultivated simultaneously. In this embodiment, the spores are introduced onto a culture medium and a tree seed is introduced into a planting medium. The seed and the spores are simultaneously incubated until the spores produce the mycelium and the tree seed germinates into a tree seedling. Ideally, the seeds will germinate in approximately the same period of time, approximately 1 to 30 days, as the spores. Then, the tree seedling is placed in the culture medium and the culture medium is incubated until the mycelium has adequately inoculated the root system. Adequate inoculation in this embodiment usually occurs within about one to 30 days after the root contacts the mycelium culture.

Other methods of inoculating tree seedlings include injecting hyphae or mycelium directly into the roots of the tree seedling. Alternatively, tree seedlings may be inoculated by grafting or notching a portion of an infected root or shoot onto an uninfected tree seedling. Tree seedlings may also be inoculated by growing the tree seedling in close proximity to an infected tree.

In one embodiment, after inoculation of the tree seedling and before the stimulation of sclerotia, the inoculated tree seedlings are planted in prepared fields or in containers and allowed to grow for at least one growing season. An appropriate prepared field should have good water drainage to prevent standing water or puddles. Ideally, the soil of the prepared field should be finely tilled and have a dark, rich, sandy, loam quality. If the nutrients in the soil seem to be lacking, additional nutrients may be added by sprinkling a fertilizer over the soil and tilling the fertilizer into the soil. It may be helpful to leave narrow grassy lanes between the rows of clustered seedlings to allow the maneuvering of equipment for mulching, watering and other purposes. Mulching by mowing the grass and letting moderate amounts of clippings accumulate around the trees may assist in maintaining a cool and damp environment for the roots, and may help to eliminate competing grasses and weeds. In addition, shading (providing shade) the seedlings may also assist in maintaining a cool and damp environment for the roots.

The seedlings are allowed to grow in the prepared fields or indoors for at least one growing season. A growing season equates to approximately one year. Although the seedlings may be planted any time before the first frost, September is an ideal time to plant the seedlings, because this allows the tree seedling to establish itself prior to the frost; thus enabling the seedling to withstand the trials of winter and the trials of the summer months of the following year. The seedlings may be covered with mulch for added protection in the winter months.

In an effort to protect the roots of the tree seedling during the summer months of the growing season or seasons, the seedlings should be supplied with water and mulch, and competition from weeds or grass should be minimized. Although the seedlings can tolerate full sunlight for the entire the day, they will grow with better success in full morning sun and late afternoon shade. Special care should be taken to protect the seedlings from temperatures that rise above 29.4° C. (85° F.). Specifically, greenhouses should be well ventilated to remove excess heat during the summer months, and should provide mottled or translucent shade, up to 50%. In greenhouses and in fields, automated watering systems may be used to cool the delicate roots of the seedling and the developing *Morchella mycorrhizas* during times of extreme heat. Mulching around the plants helps to protect the root system from heat and drying.

Although the tree seedlings may be grown for only one growing season before stimulating sclerotia formation, mycorrhizal growth and ultimately the number of sclerotia formed is directly proportional to the expanse and growth of the tree's root system. Consequently, the longer the inoculated root system is allowed to grow and expand, the greater the number of sclerotia formed and the larger the subsequent harvest of ascocarps. Therefore, a higher yield may be obtained by growing the inoculated tree seedlings for more than one growing season.

After one or more growing seasons has elapsed, the mycelium is stimulated to form sclerotia. This stimulation step may be accomplished by distressing the tree. The trees are distressed in late spring or in early summer to allow the mycelium to retract and form sclerotia before winter. Each developing sclerotia will locate itself at a point closest to ground level and will eventually separate entirely from the dying roots. The sclerotia will complete its maturation during the summer or fall and then lie dormant during the winter awaiting the ideal conditions of spring before transforming itself into an ascocarp. After the trees have been terminated the developing sclerotia under the ground may be covered with mulch and watered to protect the developing sclerotia from draught.

Several different methods may be used to distress the tree. For instance, in one embodiment, the tree is distressed by severing the shoot system of the tree from the root system. In this embodiment, the shoot system of the tree is cut off at or slightly above ground level. This disrupts the symbiotic relationship, thereby stimulating the formation of the sclerotia.

Other methods for distressing the tree include: defoliating the tree by burning the tree or docking the branches; introducing disease, such as Dutch Elm disease; smothering the leaves of the tree, such as by spraying the leaves with a stoma-blocking substance; and impeding photosynthesis.

Next, the developed sclerotia are induced to form ascocarps. Spring typically provides conditions that are conducive to this inducement step. These conditions include steadily warming weather with temperatures in the range of about 65° F. to about 85° F. and sufficient amounts of water. Although these conditions typically occur naturally in spring, these conditions may be simulated in an indoor, climate controlled environment. During periods of extremes in heat or drought, the field of cultivating ascocarps should be watered regularly. Continued daily watering during this period and during the sprouting phase of the ascocarps should continue until the ascocarps have reached their maximum size, which typically occurs within about four to five days of the initial sprout. The ascocarps can then be harvested and packaged for transport to a market place.

Figure 6:
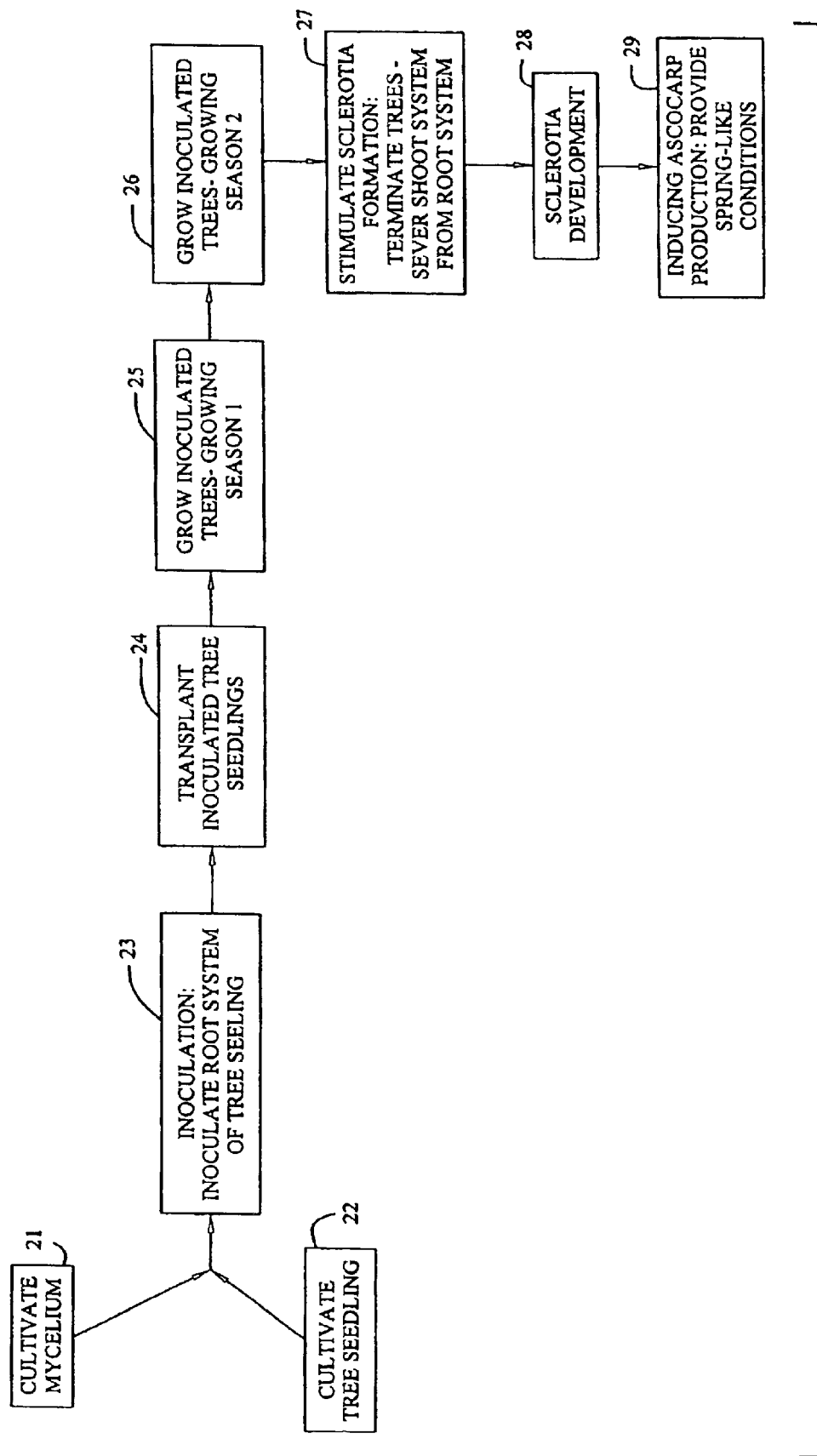
FIG. 6 is a flow chart of the process of the present invention according to one embodiment.

FIG. 6 is a flow chart summarizing the steps, all of which have been described in detail above, involved in cultivating Morchella ascocarps according to one embodiment of the present invention. First, mycelium is cultivated 21 and tree seedlings are cultivated 22, both of which can be cultivated simultaneously as discussed above. Next, the root system of the tree seedling in inoculated 23. Once inoculated, the tree seedlings are transplanted 24. The transplanted seedlings or trees are grown for two growing seasons 25, 26. Then, sclerotia formation is stimulated 27 by terminating the trees, which may be accomplished by severing the shoot system from the root system. The sclerotia is the alowed to develop 28, for approximately one half of a growing season. Finally, ascocarp production is induced 29 by providing spring-like conditions, and the ascocarps can be harvested in late spring. In some cases, a secondary crop of ascocarps are produced in the spring of the following year and may be harvested. Table 1, below is a Time Table representing the cultivation process summarized in FIG. 6.

TABLE I

Time Table for the Cultivation of Morchella Ascocarps

| | Jan. | Feb. | March | April | May | June | July | Aug. | Sept. | Oct. | Nov. | Dec. |
|---|---|---|---|---|---|---|---|---|---|---|---|---|
| Year 1 | | | | | Inoculation and growth of Root System | | | | Transplant seedling | Growing Season 1 | | |
| Year 2 | Growing Season 1 (continued) | | | | Growing Season 2 | | | | | | | |
| Year 3 | Growing Season 2 (continued) | | | | Termination of Trees | Development and maintenance of Sclerotia | | | | | | |
| Year 4 | Development and maintenance of Sclerotia | | Spring Conditions/Ascocarp formation and development | | Harvest Ascocarps | | | | | | | |

In another embodiment of the present invention, rather than inducing the formation of ascocarps, the sclerotia are harvested. More particularly, after one or more growing seasons has elapsed, the mycelium is stimulated to form sclerotia. This stimulation step may be accomplished by distressing the tree as discussed above. The trees are distressed in late spring or in early summer to allow the mycelium to retract and form sclerotia before winter. Each developing sclerotia will locate itself at a point closest to ground level and will eventually separate entirely from the dying roots. The sclerotia will complete its maturation during the summer or fall, after which the sclerotia are harvested by digging up the sclerotia. Since the sclerotia develop at the roots of the known inoculated tree seedlings, they are relatively easy to locate and harvest.

In another aspect of this invention, the Morchella mycelium is used to accelerate tree growth. As discussed above, the present inventor has discovered that Morchella mycelium forms a mutualistic relationship with the root system of trees. While the tree provides the fungus with a food source such as fruit or sap, the fungus aids the tree's root system in the uptake of water and nutrients from the soil. This discovery has led to an embodiment of the present invention in which tree growth is accelerated by inoculating the root system of the tree with mycelium. Such inoculation may be accomplished using the methods described above. Such inoculated trees demonstrate an initial growth rate of about three times that of non-inoculated trees. For example, when elm tree seedlings were inoculated with the Morchella mycelium and grown in pots for one growing season (May–October), the average height of 50 inoculated trees was about 47.5 cm (19 inches), whereas the average height of 50 uninoculated trees was only about 15 cm (6 inches).

This method for accelerating tree growth can be extremely beneficial to nurseries in the development and sale of trees. This method may also be beneficial in the restoration of developed, destroyed or logged forests and landscapes.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A process for cultivating *Morchella scierotia* using mycelium and a tree seedling, the process comprisng the steps of:

inoculating a root system of the tree seedling with the mycelium to produce an inoculated tree seedling;

distressing a shoot system of the inoculated tree seedling, said step of distressing the shoot system causing at least a portion of the root system to die and stimulating the formation of sclerozia from the mycelium in the dying root system; and harvesting the sclerotia by removing the sclerotia prior to the formation of an ascocarp.

2. The process of claim 1 further comprising the step of cultivating the mycelium by the steps of:

introducing spores onto a culture medium; and incubating the spores until the spores produce the mycelium.

3. The process of claim 2 wherein said step of inoculating the root system with the mycelium comprises:

introducing the root system of the tree seedling into the culture medium; and incubating the culture medium until the mycelium has inoculated the root system.

4. The process of claim 2 wherein said step of inoculating the root system with the mycelium comprises:

adding a planting medium on top of the culture medium;

placing at least one tree seed on top of the planting medium; germinating the tree seed into the tree seedling; and growing the tree seedling until the root system is inoculated with the mycelium.

5. The process of claim 1 further comprising the step of cultivating the mycelium by the steps of:

introducing a plurality of spores into a container of culture medium;

placing the container of culture medium in a planting medium;

covering the culture medium and the planting medium with a germinating medium; and incubating the spores until the spores produce the mycelium.

6. The process of claim 5 wherein aaid step of inoculating the root system with the mycelium comprises:

placing at least one tree seed in the germinating medium;

germinating the tree seed into the true seedling; and growing the tree seedling until the root system is inoculated with the mycelium.

7. The process of claim 1 wherein said step of inoculating the root system comprises:

introducing spores onto a culture medium;

introducing a tree seed into a planting medium;

simultaneously incubuting the spores and the tree seed until the spores produce the mycelium and the tree seed germinates into the free seedling;

placing the tree seedling on the culture medium; and incubating the culture medium until the mycelium has inoculated the root system.

8. The process of claim 1 wherein said step of inoculating the root system with the mycelium comprises injecting the myceium into die tree seedling.

9. The process of claim 1 wherein said step of inoculating the root system with the mycelium comprises grafting a portion of an inoculated tree seedling onto the tree seedling.

10. The process of claim 1 wherein said step of inoculating the root system with the mycelium comprises growing the tree seedling in close proximity to an inoculated tree.

11. The process of claim 1 further comprising the step of growing the inoculated tree seedling for at least one growing season.

12. The process of claim 1 wherein said step of distressing a shoot system comprises severing the shoot system from the root system.

13. The process of claim 1 wherein said stop of distressing a Shoot system comprises defoliating the tree.

14. The process of claim 1 wherein the shoot system of the tree seedling comprises leaves and said step of distressing a shoot system comprises smothering the leaves.

15. The process of claim 1 wherein distressing the shoot system of the tree seedling comprises allowing sclerotia to develop for at least one growing season after distressing the shoot system.

* * * * *